Oct. 23, 1962

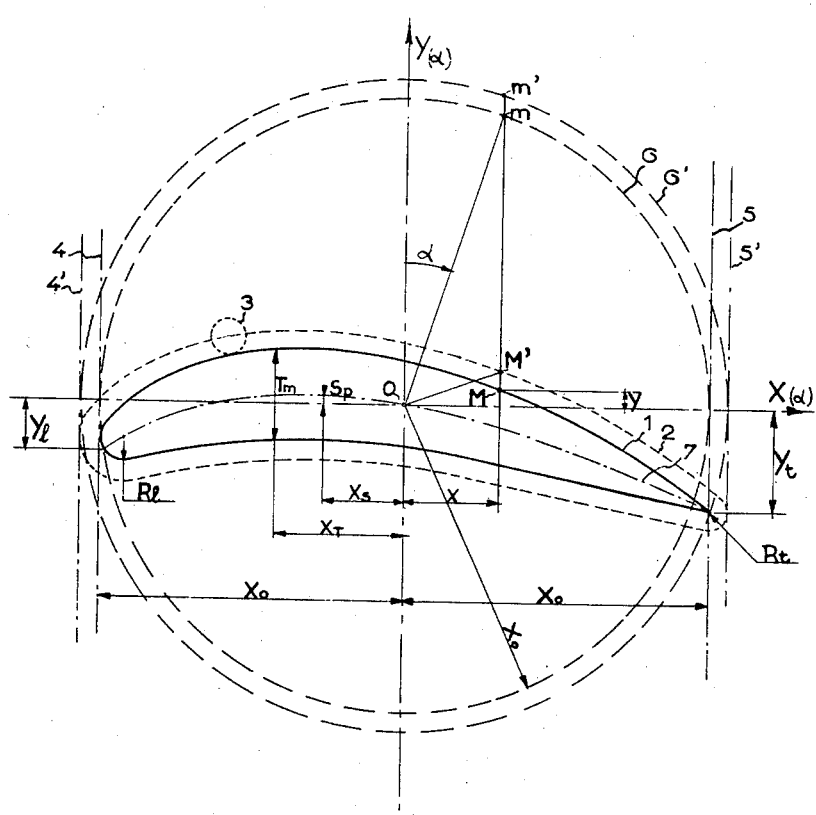
FIG_1.

G. G. FAYARD 3,059,852

CONTROL UNIT FOR MACHINE TOOL

Filed Dec. 3, 1957

$Y_\alpha = 0.646 A\cos\alpha + 0.513 A\cos2\alpha - 0.315 A\sin2\alpha$ $Y_\alpha = 1.05 A\cos\alpha - 0.15 A\sin\alpha + 0.9 A\cos2\alpha - 0.3 A\sin2\alpha + 0.15 A\cos3\alpha - 0.15 A\sin3\alpha$ $Y_\alpha = 0.97 A\cos\alpha + 0.106 A\cos2\alpha - 0.327 A\sin2\alpha + 0.117 A\cos3\alpha$ $Y_\alpha = A\cos\alpha - 0.2 A\sin2\alpha$

FIG_2e
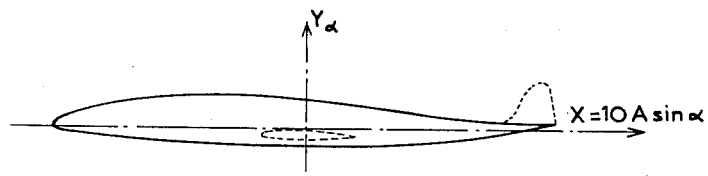
$Y_\alpha = 0.8 A\cos\alpha - 0.2 A\sin 2\alpha + 0.1 A\cos 3\alpha - 0.15 A\sin 3\alpha$
FIG.2f
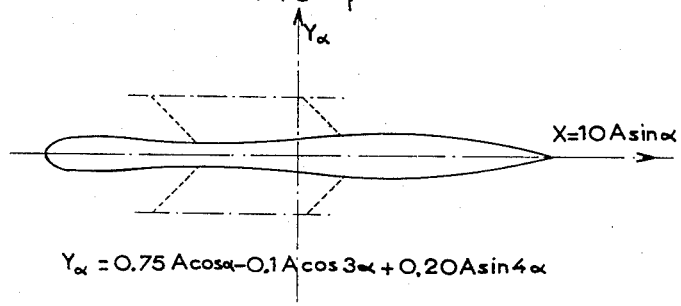
$Y_\alpha = 0.75 A\cos\alpha - 0.1 A\cos 3\alpha + 0.20 A\sin 4\alpha$
FIG_2g
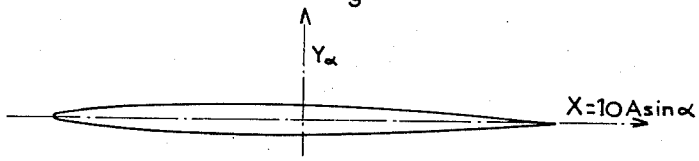
$Y_\alpha = 0.509 A\cos\alpha - 0.133 A\sin 2\alpha + 0.05 A\cos 3\alpha$

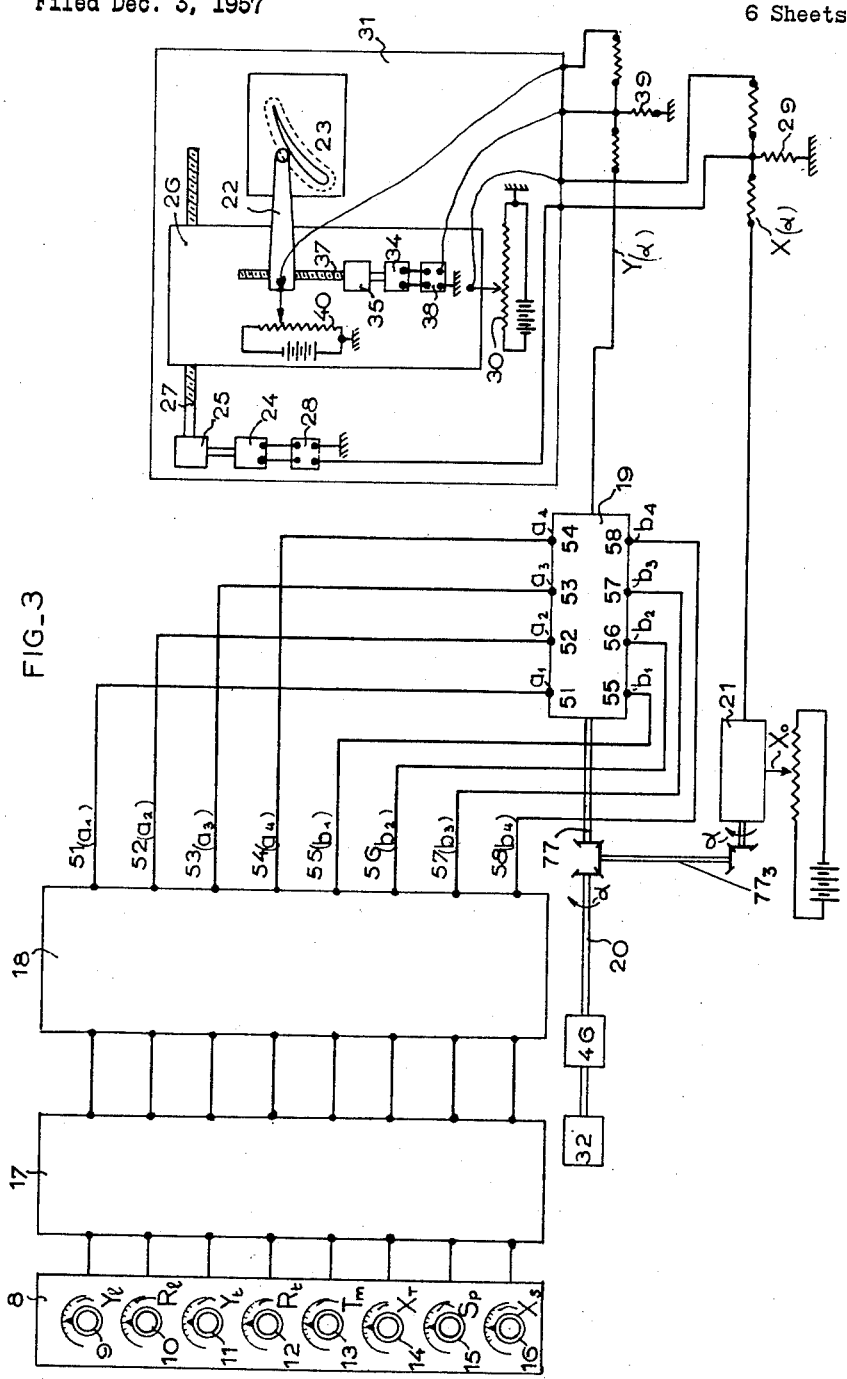

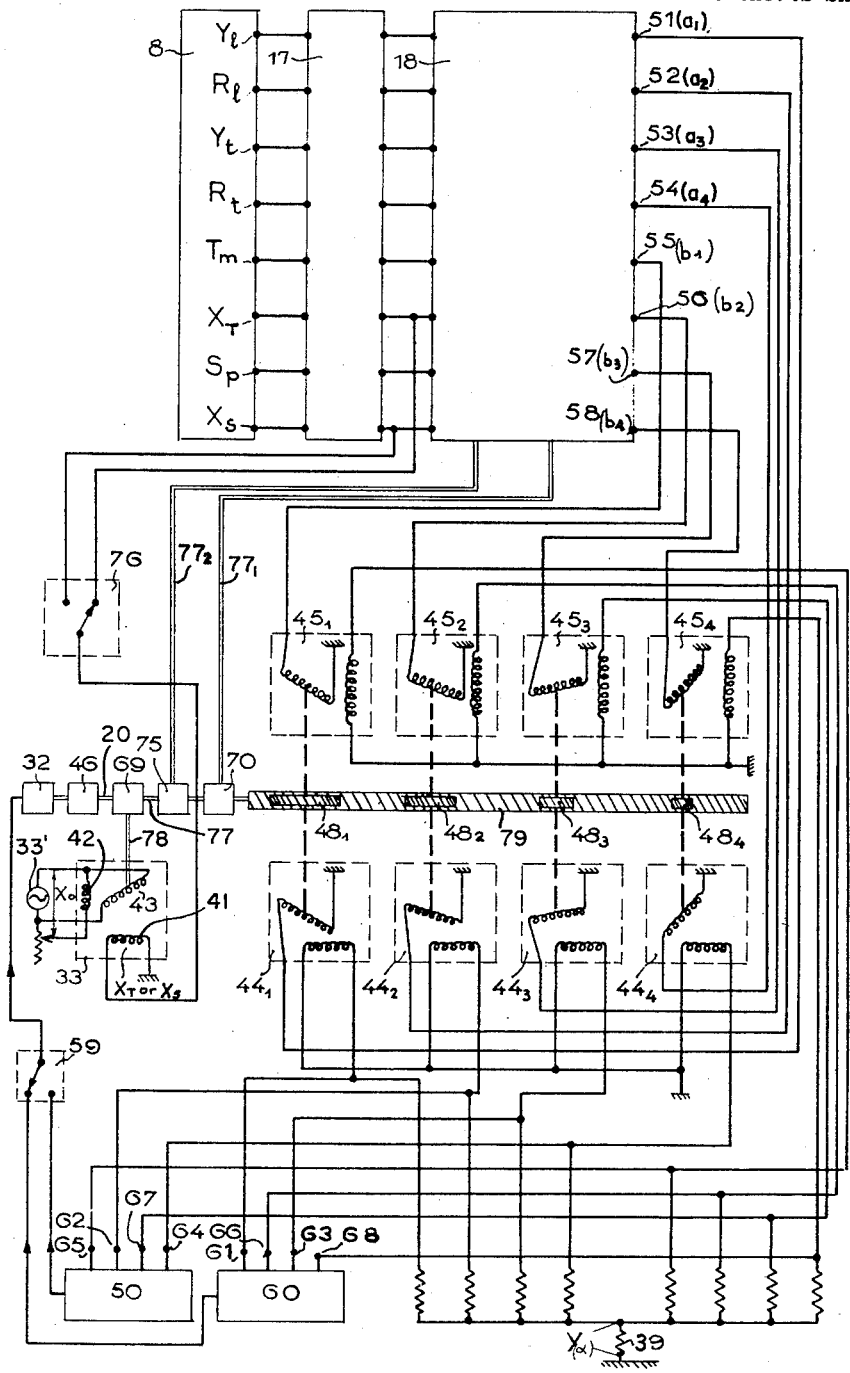
FIG_4

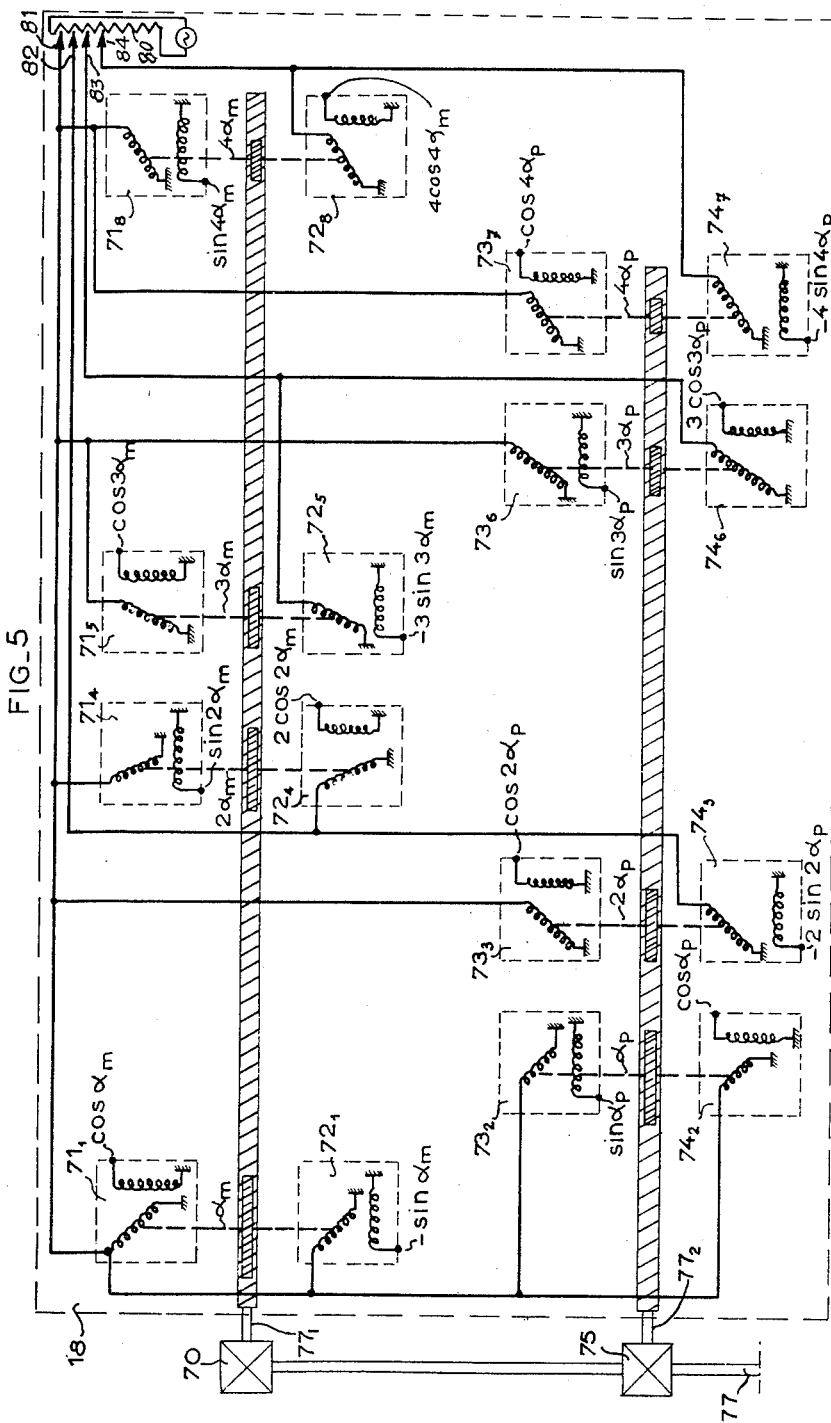

United States Patent Office 3,059,852
Patented Oct. 23, 1962

3,059,852
CONTROL UNIT FOR MACHINE TOOL
Georges G. Fayard, Paris, France, assignor to Office National d'Etudes et de Recherches, Aeronautiques, Chatillon-sous-Bagneux, France, a French body corporate
Filed Dec. 3, 1957, Ser. No. 700,368
2 Claims. (Cl. 235—180)

The present invention relates to control units for automatically controlled machines for the shaping of turbine, compressor or propeller blades, wings and fuselages of airplane models and templates and the like.

The invention provides a control unit for a machine-tool of this type which dispenses with memory devices for the shapes of patterns such as cams to be followed by a feeler, or magnetic or perforated tapes which record a function of space for reproduction by the machine.

The object of the invention is to provide a control unit for a machine-tool requiring only that the profile to be followed by the cutting tool of the machine be known by the values of geometrical data of said profile.

A further object of the invention is to provide means for producing machined profiles or models in which a certain number of geometrical data remain constant from sample to sample, whereas one or more other geometrical values vary from sample to sample. This makes it possible to determine experimentally the influence of such particular elements of data on the performance of the finished piece or model.

It is known that the profiles of turbine blades, wings and fuselages of airplane models are closed curves that can usually be defined in Cartesian or polar parametric coordinates which can be developed in the form of Fourier series of an angular parameter limited to a certain number of terms. A complete description of the profile is obtained by causing the angular parameter to vary between zero and $2\pi$. Prior attempts have been made to control machine tools by control units generating signals representative of the abscissa and the ordinate of the profile to be machined through Fourier analysis and synthesis. The parameter chosen has been, so far as I am aware, the polar angle of a point on the profile. This has the advantage of making it possible to drive by the same movement the pattern and workpiece supports and the analyzer and synthesizer of the control unit. But practice has shown that, for aerodynamic profiles, the convergence of the Fourier series in terms of such a parameter was rather poor. I have found that, by a proper choice of the angular parameter in terms of which the Cartesian or polar coordinates of the profile are expressed, it is possible, for a given limit of accuracy, to obtain developments having good convergence and a small number of terms. The geometrical significance of the parameter chosen according to the invention will be given hereinafter. Though I do not desire that the invention as set forth in the appended claims depend upon such an explanation, I am of mind that the reduction of the terms of the Fourier series of the coordinate developments obtained with the parameter I choose is due to the fact that two points respectively located on the extrados and the intrados of the profile at the same abscissa along the general extension of the same correspond to simply interrleated values of the parameter. These are the two values of the parameter relative to said points are supplementary angles, while in the case where the parameter is the polar angle of the running point of the profile, there is not any simple relationship between these two values. With my choice of parameter, the abscissa is then always a sine function of the parameter. Unfortunately, the polar angle of a point of the profile is no longer equal to the parameter, but is itself a limited Fourier series of the same. It results that machining operations can no longer be performed by rotating the workpiece support in terms of the parameter and by controlling a radial tool in terms of the radius vector value. Rather in accordance with the invention the machining operation is controlled in terms of rectangular Cartesian co-ordinates, no rotational movement being imparted to the workpiece support.

I have disclosed, in my copending application Ser. No. 545,397, now Patent No. 2,930,084, filed November 7, 1955 and assigned to the same assignee as the present application, harmonic synthesizer means which, receiving as input data the numerical values of the Fourier coefficients, supplies in the form of voltages the instantaneous values of the cartesian coordinates to servomechanisms adjusting the position of the cutter of a machine-tool with respect to the workpiece to be machined.

I have further found that, due, and only due, to the geometrical significance of the chosen parameter, the geometrical data usually of dominant influence in the design of turbine blades or aerodynamic profiles or their square root are linear functions of the coefficients of the sine and cosine terms in the developments of the co-ordinates and consequently that said coefficients are given, from said data, by linear simultaneous algebraic equations. This property will be explained later.

The control unit of the invention comprises a computing machine transforming the geometrical data of the profile into coefficients of the Fourier series representative of the coordinates and a harmonic synthesizer effecting the summation of the series, said computing machine and synthesizer being suitably interconnected as to allow the latter to contribute to the computation.

The geometrical data which are particularly important in the case of hydrodynamic and aerodynamic profiles are for example, the sagitta of the median line of the profile and eventually the abscissa of the location of said sagitta, the ordinates and the radii of curvature of the leading and trailing edges and the maximum thickness of the profile and its location. Other data may be considered according to the general scope of the invention, as for example the location of a point of inflection, etc.

The invention will now be described in detail by reference to the accompanying drawings in which:

FIG. 1 is a diagram of a right section or profile of a turbine blade, indicating the geometrical significance of the angular parameter as a function of which the profile coordinates are developed;

FIG. 3 is a schematic representation of the succession of operations involved in machining a profile from the geometric data values identified in FIG. 1;

FIG. 4 is a diagram of the control unit of the invention, showing the computing machine and the synthesizer cooperating therewith, together with the servomechanisms for positioning the cutting tool of the machine, and FIG. 5 is a particular view of the matrix of the machine.

Figure 2A:
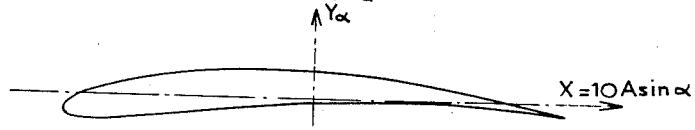
FIGS. 2a and 2g represent well known aerodynamic profiles and indicate the corresponding parametric developments. Under each profile, only the development in Fourier series of the ordinate is written, the abscissa being always taken as a simple sinusoidal function.

FIG. 1 illustrates at reference character 1 the right section or profile of a blade and at reference character 2 the curve traced out by the axis of a rotating cutter 3. The path followed by the axis of the cutter will hereinafter be referred to as "the parallel curve." The angular parameter in terms of which are developed the Cartesian coordinates of the profile or of the parallel curve is defined in the following manner. Two tangents 4—5 (or 4'—5') parallel to each other and bordering either the profile 1 itself or the parallel curve 2 nearest the leading edge and trailing edge of the same (in FIG. 1, 4'—5' are tangent to the parallel curve 2) are traced out and their distance represents the length $2X_0$ of the parallel curve or of the profile in their direction of major extension.

The angle $\alpha$ taken as a parameter represents, in FIG. 1, the polar angle of a point $m$ on a circle 6 tangent to the two parallel tangents 4—5 (or of a point $m'$ on a circle 6' tangent to the two parallel tangents 4'—5') just mentioned, the center O of this circle taken as the origin of the coordinates being located inside the blade at a point the location of which is a matter of choice, but is preferably on the median line 7 of the blade. The point $m$ or $m'$ have the same abscissa as the point $M'$ on the parallel curve and the point M on the profile. Under these conditions, I have found that, the abscissa of the points M (or $M'$) being taken equal to a sinusoidal function of $\alpha$, the ordinate may be developed in a Fourier series of $\alpha$, which, for the usual profiles known in hydrodynamics and aerodynamics, has a good convergence and comprises four terms or less.

Theoretically, the machining of a model requires the knowledge of the parametric equation of the parallel curve. However, means are known from my abovementioned copending application for automatically machining models from the knowledge of the Fourier developments of the profile itself. Consequently, there will be considered only in the following the developments in Fourier series of the profiles and not those of the parallel curves.

Figure 2B:
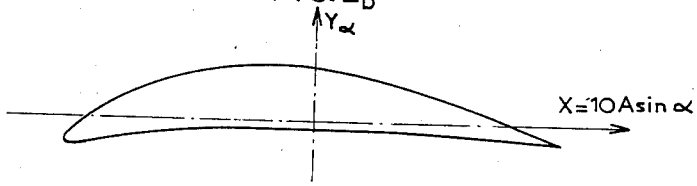
Figure 2C:
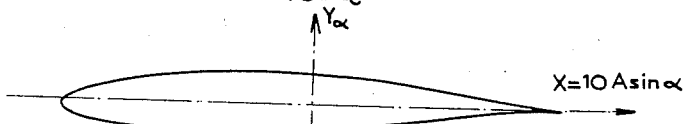
Figure 2D:
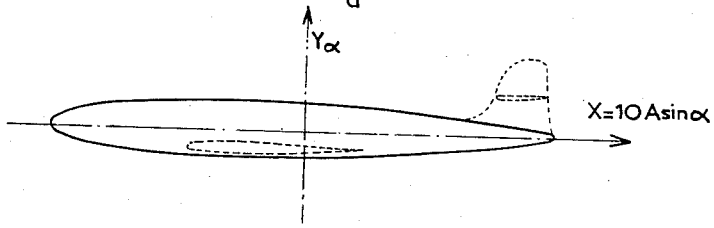

FIGS. 2a to 2g represent well known aerodynamic profiles and the corresponding parametric developments. In all of these profiles, the coordinate X is taken equal to $X_0 \sin \alpha$. That of FIG. 2a is a profile by Joukowsky. That of FIG. 2b is a profile of Legendre. FIG. 2c represents a profile identified as No. 64–1–212 of the National Advisory Committee for Aeronautics (NACA). That of FIG. 2d is a fuselage profile of the type of the Gloster "Meteor," whereas FIG. 2e is that of a super G. Constellation. FIG. 2f represents a profile of a fuselage showing in dashed lines wing junctions with recesses on the fuselage according to the proposals of Whitcomb. This profile terminates in an ogive. FIG. 2g represents a wing profile, NACA No. 64–A–0–06.

It will be seen that of the seven examples shown in FIGS. 2a to 2g four, those of FIGS. 2a, 2c, 2d and 2g are profiles obtained from developments which include as regards the coordinate Y, at most one term in $\cos \alpha$, one term in $\cos 2\alpha$, one term in $\sin 2\alpha$, and one term in $\cos 3\alpha$. The other profiles of FIGS. 2b, 2e and 2f are developed respectively in six, four and three terms.

These profiles and the developments by which they may be reproduced underscore the utility of the invention as hereinabove already described inasmuch as it clearly appears that a very small number of coefficients suffices to reproduce any one of these known profiles. It will be assumed in the following that the ordinate may be limited to the fourth order and written in the form:

$$Y(\alpha) = a_1 \cos \alpha + b_1 \sin \alpha + a_2 \cos 2\alpha + b_2 \sin 2\alpha + a_3 \cos 3\alpha + b_3 \sin 3\alpha + a_4 \cos 4\alpha + b_4 \sin 4\alpha$$

The geometrical data which define the blade or more generally the profile are shown in FIG. 1. They are:

The ordinate of the leading edge, to be designated by $Y_1$;
The radius of curvature of the leading edge, to be called $R_1$;
The ordinate of the trailing edge to be designated by $Y_t$;
The radius of curvature of the trailing edge, to be called $R_t$;
The maximum thickness, to be called $T_m$;
The abscissa of said maximum thickness, to be called $X_T$;
The sagitta of the median line, to be called $S_p$;
The abscissa of said sagitta, to be called $X_S$.

Of course, certain of these quantities, such as $Y_1$, $Y_t$, $R_t$, $S_p$, ... may be made equal to zero.

These quantities may be written directly as functions of $a_1$, $b_1$, $a_2$, $b_2$, $a_3$, $b_3$, $a_4$, $b_4$; thus:

(1°)—*Ordinate of the Leading Edge* $Y_1$ $$Y_1 = \frac{1}{2}[Y(\alpha_1) + Y(\pi - \alpha_1)]$$

where $\alpha_1$ is the value of the parameter corresponding to the leading edge which is approximately equal to $3\pi/2$.

$$Y_1 = -b_1 - a_2 + b_3 + a_4 \quad (1)$$

(2°)—*Radius of Curvature of the Leading Edge* $R_1$ $$R_1 = \frac{(X'^2 + Y'^2)^{\frac{3}{2}}}{X'Y'' - Y'X''}$$

for $$\alpha_1 = \frac{3\pi}{2} \text{ (approximately)}$$

where $X'$ and $Y'$ are the first derivatives and $X''$ and $Y''$ are the second derivatives of X and Y respectively with respect to $\alpha$. Calculation gives:

$$R_1 = (a_1 - 2b_2 - 3a_3 + 4b_4)^2 / X_0 \quad (2)$$

(3°)—*Ordinate of the Trailing Edge* $Y_t$ $$Y_t = \frac{1}{2}[Y(\alpha_t) + Y(\pi - \alpha_t)]$$

where $\alpha_t$ is the value of the parameter corresponding to the trailing edge which is approximately equal to $\pi/2$.

$$Y_t = b_1 - a_2 - b_3 + a_4 \quad (3)$$

(4°)—*Radius of Curvature of the Trailing Edge* $R_t$ $$R_t = \frac{(X'^2 + Y'^2)^{3/2}}{X'Y'' - Y'X''}$$

for $$\alpha_t = \frac{\pi}{2} \text{ (approximately)}$$

$$R_t = (a_1 + 2b_2 - 3a_3 - 4b_4)^2 / X_0 \quad (4)$$

Formulae 1 to 4 show that, due to the geometrical significance of the chosen parameter which involves that the parameter values of the leading and trailing edges are respectively integral quarters of $2\pi$, namely $3\pi/2$ and $\pi/2$, $Y_1$, $\sqrt{R_1}$, $Y_t$, $\sqrt{R_t}$ are linear functions of the coefficients of the Fourier series development of Y considered as unknowns and reversedly the unknowns $a_1$–$a_4$, $b_1$–$b_4$ are linear functions of $Y_1$, $\sqrt{R_1}$, $Y_t$, $\sqrt{R_t}$, the said linear functions having constant numerical coefficients.

(5°)—*Maximum Thickness* $T_m$ $$T_m = Y(\alpha_m) - Y(\pi - \alpha_m)$$

$$T_m = 2(a_1 \cos \alpha_m + b_2 \sin 2\alpha_m + a_3 \cos 3\alpha_m + b_4 \sin 4\alpha_m) \quad (5)$$

where $\alpha_m$ and $(\pi - \alpha_m)$ are the parameters of the points of the profile between which extends the maximum thickness parallel to the axis OY. $\alpha_m$ Must satisfy the condition that the derivative of $T_m$ with respect to $\alpha_m$ shall be zero, i.e.:

$$-a_1 \sin \alpha_m + 2b_2 \cos 2\alpha_m - 3a_3 \sin 3\alpha_m + 4b_4 \cos 4\alpha_m = 0 \quad (6)$$

The value of $$\alpha_m = \sin^{-1} \frac{X_T}{X_0}$$

results from Equation 6' infra. In the case where $X_T$ is not imposed, Equations 5 and 6 between which $\alpha_m$ is to be eliminated are equivalent to one relation between the coefficients $a-b$. In the case where $X_T$ and consequently $\alpha_m$ is imposed, these equations are equivalent to two relations between the coefficients $a-b$.

(6°)—*Abscissa of the Maximum Thickness* $X_T$ $$X_T = X_0 \sin \alpha_m$$

whence $$\alpha_m = \sin^{-1} \frac{X_T}{X_0} \quad (6')$$

(7°)—*Sagitta of the Median Line* $S_p$ $$S_p = \frac{1}{2}[Y(\alpha_p) + Y(\pi - \alpha_p)] = b_1 \sin \alpha_p + a_2 \cos 2\alpha_p$$
$$+ b_3 \sin 3\alpha_p + a_4 \cos 4\alpha_p \quad (7)$$

where $\alpha_p$ and $(\pi - \alpha_p)$ are the parameters of the points at the intersection of the profile and of the straight line parallel to OY passing through the point of upper ordinate of the median line. $\alpha_p$ Must satisfy the condition that the derivative of $S_p$ with respect to $\alpha_p$ shall be zero, i.e.:

$$b_1 \cos \alpha_p - 2a_2 \sin 2\alpha_p + 3b_3 \cos 3\alpha_p - 4a_4 \sin 4\alpha_p = 0 \quad (8)$$

The value of $$\alpha_p = \sin^{-1} \frac{X_s}{X_0}$$

results from Equation 8′ infra. In the case where $X_s$ is not imposed, Equations 7 and 8 between which $\alpha_p$ is to be eliminated are equivalent to one relation between the coefficients $a-b$. In the case where $X_s$ and consequently $\alpha_p$ is imposed, these equations are equivalent to two relations between the coefficients $a-b$.

(8°)—*Abscissa of the Sagitta of the Median Line* $X_s$ $$X_s = X_0 \sin \alpha_p$$

whence $$\alpha_p = \sin^{-1} \frac{X_s}{X_0} \quad (8')$$

Formulae 5, 6, 6′, 7, 8, 8′ show that, due to the geometrical significance of the chosen parameter which involves that the two points limiting the maximum thickness and the two points at which the sagitta of the median line cross the profile have supplementary parameter values, $$\begin{vmatrix} Y_1 \\ (R_1 X_0)^{1/2} \\ Y_t \\ (R_t X_0)^{1/2} \\ T_m/2 \\ X_T \\ S_p \\ X_s \end{vmatrix} = \begin{vmatrix} 0 & -1 & -1 & 0 & 0 & 1 & 1 & 0 \\ 1 & 0 & 0 & -2 & -3 & 0 & 0 & 4 \\ 0 & 1 & -1 & 0 & 0 & -1 & 1 & 0 \\ 1 & 0 & 0 & 2 & -3 & 0 & 0 & -4 \\ \cos \alpha_m & 0 & 0 & \sin 2\alpha_m & \cos 3\alpha_m & 0 & 0 & \sin 4\alpha_m \\ -\sin \alpha_m & 0 & 0 & 2\cos 2\alpha_m & -3\sin 3\alpha_m & 0 & 0 & 4\cos 4\alpha_m \\ 0 & \sin \alpha_p & \cos 2\alpha_p & 0 & 0 & \sin 3\alpha_p & \cos 4\alpha_p & 0 \\ 0 & \cos \alpha_p & -2\sin 2\alpha_p & 0 & 0 & 3\cos 3\alpha_p & -4\sin 4\alpha_p & 0 \end{vmatrix} \times \begin{vmatrix} a_1 \\ b_1 \\ a_2 \\ b_2 \\ a_3 \\ b_3 \\ a_4 \\ b_4 \end{vmatrix} \quad (17)$$

$T_m$, $X_T$, $S_p$, $X_s$ are linear functions of the coefficients of the Fourier series developments of Y considered as unknowns and reversedly the unknowns $a_1-a_4$, $b_1-b_4$ are linear functions of $T_m$, $X_T$, $S_p$, $X_s$ the said linear functions having constant trigonometrical coefficients.

It results from the preceding equations that the knowledge of the values of a certain number of geometrical data of the profile, namely $Y_1$, $R_1$, $Y_t$, $R_t$, $T_m$, $X_T$, $S_p$, $X_s$ impose between the coefficients $a$ and $b$ of the development of Y the following relationships $$-b_1 - a_2 + b_3 + a_4 = Y_1 \quad (9)$$

$$a_1 - 2b_2 - 3a_3 + 4b_4 = \pm (R_1 X_0)^{1/2} \quad (10)$$

$$b_1 - a_2 - b_3 + a_4 = Y_t \quad (11)$$

$$a_1 + 2b_2 - 3a_3 - 4b_4 = \pm (R_t X_0)^{1/2} \quad (12)$$

$$a_1 \cos \alpha_m + b_2 \sin 2\alpha_m + a_3 \cos 3\alpha_m + b_4 \sin 4\alpha_m = T_m/2 \quad (13)$$

$$-a_1 \sin \alpha_m + 2b_2 \cos 2\alpha_m - 3a_3 \sin 3\alpha_m + 4b_4 \cos 4\alpha_m = 0 \quad (14)$$

$$b_1 \sin \alpha_p + a_2 \cos 2\alpha_p + b_3 \sin 3\alpha_p + a_4 \cos 4\alpha_p = S_p \quad (15)$$

$$b_1 \cos \alpha_p - 2a_2 \sin 2\alpha_p + 3b_3 \cos 3\alpha_p - 4a_4 \sin 4\alpha_p = 0 \quad (16)$$

It may be noted that all these equations in which the Fourier's series coefficients $a_1$, $a_2$, $a_3$, $a_4$, $b_1$, $b_2$, $b_3$, $b_4$ are the unknowns, are of the general type:

$$K = \sum_{j=1}^{n} \epsilon_j \begin{Bmatrix} \sin j\alpha_i \\ \cos j\alpha_i \end{Bmatrix} a_j + \sum_{k=1}^{n} \epsilon_k \begin{Bmatrix} \sin k\alpha_i \\ \cos k\alpha_i \end{Bmatrix} b_k$$

where K is a constant which may be equal to zero, $\alpha_i$ denotes particular values of the angular parameter and $\epsilon_j$ and $\epsilon_k$ are factors equal to unity or respectively to $j$ or $k$ according to the equation concerned. When in the factor multiplying the unknown $a_j$ (or $b_k$), $\epsilon_j$ (or $\epsilon_k$) is equal to unity the said factor will be called in the appended claims "unweighted trigonometric function"; when $\epsilon_j$ (or $\epsilon_k$) is equal to $j$ (or $k$), the corresponding factor will be called "weighted trigonometric function."

All the first members of the equations, Equations 9 to 12 included, are limited Fourier series of specific values of the parameter. For example the first member of Equation 9 is equal to the first member of Equation 15 with $\alpha_p = 3\pi/2$; the first member of Equation 11 is equal to the first member of Equation 15 with $\alpha_p = \pi/2$; the first member of Equation 10 is equal to the first member of Equation 14 with $\alpha_m = 3\pi/2$ and the first member of Equation 12 is equal to the first member of Equation 14 with $\alpha_m = \pi/2$.

The synthesizer comprised in the apparatus of the invention has two modes of operations: (i) receiving as input data the coefficients of the Fourier series development of the ordinate and a continuously varying parameter value, it produces a continuously varying output signal representing the said ordinate; (ii) receiving as input data approximative value of the coefficients of the Fourier series development of the ordinate and a continuously varying parameter value, it is allowed to stop when its output signal is equal to a predetermined value, whereby a corresponding particular value of the parameter is known and is used for deriving more precise values of the coefficients of the Fourier series.

These relationships may be written in the matrical form:

The question of the sign on the radical of Equations 10 and 12 is unimportant. To change from + to − is equivalent to changing from $\alpha$ to $\pi - \alpha$. The leading edge and the trailing edge are thus interchanged.

Computation of the unknowns $a_1 - b_1$ to $a_4 - b_4$ from the last eight equations may be performed by means of an analog or digital machine adapted to solve systems of linear equations to the input of which are applied the geometrical data. Electrical voltages representative of the values of said unknowns are applied to the harmonic synthesizer of the control unit which produces driving voltages for the cutter of the machine. It is to be stated that the computation of the trigonometric coefficients of Equations 13 to 16 is performed by the synthesizer of the control unit.

Referring to FIG. 3 of the drawings, 8 represents the plug board for the geometric data. These data are applied by means of knobs 9—16 cooperating with dials to the transducer or data translator 17 which transforms them into analog electrical voltages. Of course the dials cooperating with knobs 10 and 12 are graduated in square root proportion of the corresponding radius of curvature and the dial cooperating with knob 13 is graduated in half the maximum thickness. The translator 17 transmits the data in turn to the matrix 18 which develops in the form of electrical voltages the coefficients $a_1$ to $a_4$ respectively at terminals 51 to 54 and the coefficients $b_1$ to $b_4$ respectively at terminals 55 to 58. Computers or matrices for solving systems of $n$ linear equations with $n$ unknowns are well known in the art and it is not necessary to disclose them in full.

The values of the coefficients are applied to a harmonic synthesizer 19 driven by a motor 32 through a speed reducer 46. The shaft 20 of this speed reducer is coupled through clutches and bevel gears to a main shaft 77, a branching secondary shaft $77_3$ and several other branching secondary shafts $77_1$, $77_2$, 78, 79 to be disclosed hereinafter in FIGS. 4 and 5. The rotation of these shafts represents the parameter $\alpha$. This synthesizer gives the ordinate $Y(\alpha)$. The shaft $77_3$ drives a resolver 21 with one rotor and a single stationary winding which gives the abscissa $X(\alpha)$. Resolver 21 may be considered as a second synthesizer in the case where the Fourier series development of the coordinate to be obtained has a single sine term.

The carriage 22 which supports the cutting tool is subjected to two orthogonal motions with respect to the workpiece 23. The first motion is derived from a motor 24 which is coupled to a speed reducer 25 and then to carriage 26 via lead screw 27. The motor 24 is energized via amplifier 28, by an error voltage which appears across resistor 29 and which is equal to the difference between the voltage representative of $X(\alpha)$ and the output voltage from potentiometer 30 whose winding is fixed to the frame of the machine-tool 31 and whose slider is fixed to the carriage 26.

The second motion is applied directly to the carriage 22 which supports the cutter itself. This motion is developed by motor 34 which drives lead screw 37 through a speed reducer 35. The carriage 22 is, of course, coupled to the lead screw by means of a nut.

Motor 34 is energized via amplifier 38 from an error voltage which appears across resistor 39 and which is equal to the difference between the voltage representative of $Y(\alpha)$ and the output voltage of potentiometer 40, whose winding is fixed to the main carriage 26 and whose slider is fixed to the secondary carriage 22 which supports the cutting tool itself.

The coefficients of the matrix 18 are numerical coefficients as regards Equations 9 to 12 and trigonometrical coefficients as regards Equations 13 to 16. Although these trigonometrical coefficients can be obtained by computation, they could also be obtained by the control unit of the invention itself, whether the abscissa of the maximum thickness and of the median line sagitta be imposed or not. Generally speaking, this computation is performed by the synthesizers 19 and 21 which receives input data respectively constituted by the value of the coefficient $X_0$ of the sine function representing the abscissa, provisional values of the coefficients $a_1$-$a_4$, $b_1$-$b_4$ of the Fourier series development representing the ordinate, and a continuously varying angular value representing the parameter and are stopped when their output signal is equal to a predetermined value.

When $X_T^9$ (or $X_S$) is known, Equation 6' [or (8')] giving the corresponding value of the parameter is solved for $\alpha_m$ (or $\alpha_p$) with one resolver 33 or any other logometer device comprising an electro-mechanical servo included in known manner in a feed-back loop. The resolver 33 (FIG. 4) comprises essentially a first stator winding 41 energized by a voltage proportion to $X_T^9$ (or $X_s$) picked up at the output of analog translator 17 through switch 76, a second stator winding 42 energized by a current source 33' giving a voltage proportional to $X_0$, and a rotor winding 43 journaled on a shaft 78 which assumes the angular displacement $\alpha_m$ (or $\alpha_p$) thereby solving Equation 6' or Equation 8' above. During the operation an electromagnetic clutch 69 disconnects shaft 20 from shaft 77 and connects this latter shaft to the shaft 78.

The synthesizer comprises in the embodiment disclosed eight resolvers $44_1$ to $44_4$ and $45_1$ to $45_4$ whose rotors are respectively energized by A.C. voltages available at terminals 51—58 and proportional to $a_1 \ldots a_4$, $b_1 \ldots b_4$. Only one stator winding is necessary in each resolver and the stator windings of resolvers $44_1$-$44_4$ are respectively perpendicular to the stator windings of resolvers $45_1$-$45_4$. The rotors of the resolvers are driven by a tangent screw 79 through the shaft 77 driven itself either by shaft 20 or by shaft 78. Four worm wheels $48_1$ to $48_4$ drive directly the rotors and they have diameters such that, when the rotor of resolvers $44_1$ and $45_1$ rotate through an angle $\alpha$, those of resolvers $44_i$ and $45_i$ ($i$ integer from 1 to 4) rotate through $i\alpha$. The output voltages of the stator windings of the first set of resolvers which represent the cosine terms of the Fourier series are individually available at terminals 61–64 and are applied together in parallel to resistor 39. In the same manner, the output voltages of the stator windings of the second set of resolvers which represent the sine terms of the series are individually available at terminals 65–68 and are also applied in parallel to resistor 39.

From output 61–68, there are taken off the necessary voltages to produce by combination a voltage representative of the first member of Equation 14 and similarly a voltage representative of the first member of Equation 16. The combination is effected in devices 50 and 60 which comprise voltage multipliers, phase inverters and adding means. Devices of this kind adapted to linearly combine a plurality of voltages and the multiples thereof are well known in the art. The output voltages of devices 50 and 60 are applied, through switch 59, to the motor 32 which is stopped when the controlling voltage is zero.

If the motor 32 is controlled by the device 50, the shaft 20 when the motor is stopped represents the angle $\alpha_m$. If the motor 32 is controlled by device 60, the shaft 20 when the motor is stopped represents the angle $\alpha_p$.

In order to enter into the matrix 18, the trigonometrical functions in $\alpha_m$ referred to in the fifth and sixth lines of the square matrix of Equation 17, there are provided (FIG. 5) resolvers $71_1$, $71_4$, $71_5$ and $71_8$ whose rotors are driven by secondary shaft $77_1$ separated from the main shaft 77 by a clutch 70 and are energized by a given voltage representative of the unit of length. There are also provided resolvers $72_1$, $72_4$, $72_5$ and $72_8$ whose rotors are driven by the same shaft $77_1$ and are energized by voltages respectively representative of one time, two times, three times and four times the length unit taken respectively from sliders 81–84 of potentiometer 80.

A second set of resolvers comprising resolvers $73_2$, $73_3$, $73_6$, $73_7$, $74_2$, $74_3$, $74_6$, $74_7$ is provided to enter the trigonometrical functions in $\alpha_p$ referred to in the seventh and eighth lines of the square matrix of Equation 17. They are driven by secondary shaft $77_2$ separated from the main shaft 77 by a clutch 75. Their energization voltage values results obviously from the last line of matrix 17 and the necessary voltages are picked up at taps 81–84 of potentiometer 80 according to whether they represent one, two, three or four times the length unit.

The operation of the apparatus is the following:

The geometrical data are first entered into the plug board. If the geometrical data $X_T$ or $X_S$, or both, are imposed, the shaft 77 is disconnected by clutch 69 from shaft 20 and connected to shaft 78. The stator winding 42 of the resolver being always energized by a voltage representative of $X_0$, the stator winding 41 is successively energized by voltages representative of $X_T$ and $X_S$ by means of switch 76. When $X_T$ is applied to stator winding 41, the clutch 70 is operative and the clutch 75 unoperative. Conversely, when $X_S$ is applied to resistor 41, the clutch 75 is operative and the clutch 70 unoperative.

If the geometrical data $X_T$ or $X_S$ are not imposed, the shaft 77 remains connected to shaft 20 of speed reducer 46. The clutch 70 being engaged and the switch 59 being on the position towards 50, the shaft $77_1$ stops at a position representative of $\alpha_m$ and the trigonometrical functions of said angle are entered into the matrix 18. Then the clutch 75 being engaged and the switch 59 being on the position towards 60, the shaft $77_2$ stops at a position representative of $\alpha_p$ and the trigonometrical functions of said angle are entered into the matrix. Finally, both clutches 70 and 75 being disengaged and all the data being entered into the matrix, the machining operation may start.

While the invention has been described herein in terms of a number of preferred embodiments, numerous modifications and variations, particularly in the synthesizer structure (use of sine potentiometers instead of resolvers) may be made therein without departing from the scope of the invention itself which is set forth in the appended claims.

What I claim is:

1. Apparatus for producing continuously varying signals representative of the coordinates of a closed aerodynamic profile in terms of a continuously varying angular parameter equal, for a given point of the profile, to the polar angle of a corresponding point on a circle circumscribing said profile and tangent to two parallel straight lines tangent to the profile near the leading and trailing edges of the same, said corresponding point on said circle having the same abscissa as the point on said profile, said profile being defined by geometrical data belonging to a group comprising the ordinate and the square root of the radius of curvature of the leading edge of said profile, the ordinate and the square root of the radius of curvature of the trailing edge, the maximum thickness of the profile and the abscissa of the maximum thickness, the sagitta of the median line of the profile and the abscissa of said sagitta, whereby the abscissa of a point on the profile is a sine function of said angular parameter and the ordinate is a limited Fourier series of the parameter the coefficients of which are related to said data by a set of simultaneous linear equations in which said coefficients are the unknowns and are each multiplied by non-weighted trigonometric functions of particular values of the parameter and multiples thereof and weighted trigonometric functions equal to the products of said non-weighted functions of particular values of the parameter and of the multiples thereof by a weight equal to said multiple, said apparatus comprising linear equation solving means having as input data signals representative of said geometrical data and including, first sine potentiometer means having its output connecting to a tool following the profile for storing said unweighted trigonometric functions, second sine potentiometer means having a slider fixed to a support for the cutting tool for storing said weighted trigonometric functions, means for energizing said first potentiometer means by a reference voltage, means for energizing said second potentiometer means by multiples of said reference voltage equal to the weight of the trigonometric functions stored therein, and means for deriving from said data and unweighted and weighted trigonometric functions the values of said constant coefficients, and harmonic synthesizer means for developing from said coefficient values and said continuously varying angular parameter the value of said ordinate continuously varying with said parameter.

2. Apparatus for producing a continuously varying signal representative of the ordinate of a closed aerodynamic profile, said ordinate being expressed in the form of a limited Fourier series in terms of a parameter equal, for a given point of the profile, to the polar angle of a corresponding point on a circle circumscribing said profile and tangent to two parallel straight lines tangent to the profile near the leading and trailing edges of the same, said corresponding point on said circle having the same abscissa as the point on said profile, said profile being defined by geometrical data belonging to a group comprising the ordinate and the square root of the radius of curvature of the leading edge of said profile, the ordinate and the square root of the radius of curvature of the trailing edge, the maximum thickness of the profile, and the sagitta of the median line of the profile, said data being related to the coefficients of said limited Fourier series by a set of simultaneous linear equations in which said coefficients are the unknowns, the first members are in the form of limited Fourier series in terms of particular values of the parameter and of the multiples thereof, at least one of said particular values being unknown, and the second members are quantities depending upon the data, said apparatus comprising matrix means having as input data signals representative of said geometrical data and of supplementary data constituted by at least the unknown particular value of the parameter, said matrix means being adapted to derive from said data-representative signals a plurality of coexisting signals representative of the coefficients of said limited Fourier series, means to generate a variable cyclical signal representative of the parameter, main harmonic synthesizer means connected to said matrix means having as input data said coexisting signals and said cyclical signal, said main synthesizer means being adapted to derive from the input data thereto the value of the ordinate, a secondary harmonic synthesizer means simulating the particular linear equation containing the unknown particular value of said parameter, said secondary synthesizer means being connected to said matrix means, having as input data said coexisting signals and said cyclical signal and being adapted to derive from the input data thereto the value of the first member of said particular equation varying with said cyclical signal, and means to stop the variable cyclical signal generating means when said first member varying value is equal to the second member of said equation depending upon the data, whereby the value of the cyclical signal when the generating means is stopped constitutes the supplementary data.

References Cited in the file of this patent

UNITED STATES PATENTS

| | | |
|---|---|---|
| 2,478,973 | Mahren | Aug. 16, 1949 |
| 2,660,700 | Gates | Nov. 24, 1953 |
| 2,808,989 | Younkin | Oct. 8, 1957 |
| 2,883,110 | Spencer et al. | Apr. 21, 1959 |